(12) United States Patent
Kanagarathinam et al.

(10) Patent No.: US 12,143,282 B2
(45) Date of Patent: Nov. 12, 2024

(54) METHOD AND ELECTRONIC DEVICE FOR MANAGING NETWORK RESOURCES AMONG APPLICATION TRAFFIC (71) Applicant: SAMSUNG ELECTRONICS CO., LTD., Suwon-si (KR)

(72) Inventors: Madhan Raj Kanagarathinam, Bangalore (IN); Gunjan Kumar Choudhary, Bangalore (IN); Sunghee Lee, Suwon-si (KR); Sujith Rengan Jayaseelan, Bangalore (IN); Sri Vinod Palacharla, Bangalore (IN); Mritunjay Gupta, Bangalore (IN); Ratnakar Rao Venkata Rayavarapu, Bangalore (IN); Prakash Rao, Bangalore (IN); Ramanathan Palaniappan, Bangalore (IN); Siva Sabareesh, Bangalore (IN); Jayendra Reddy Kovvuri, Bangalore (IN); Mohan Rao Goli, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/896,607

(22) Filed: Aug. 26, 2022

(65) Prior Publication Data

US 2023/0060315 A1  Mar. 2, 2023

Related U.S. Application Data

(63) Continuation of application No. PCT/KR2022/012712, filed on Aug. 25, 2022.

(30) Foreign Application Priority Data

Aug. 26, 2021 (IN) .............................. 202141038707
Aug. 10, 2022 (IN) .............................. 202141038707

(51) Int. Cl.
*G06F 15/173* (2006.01)
*H04L 43/02* (2022.01)
(Continued)

(52) U.S. Cl.
CPC .............. *H04L 43/02* (2013.01); *H04L 43/04* (2013.01); *H04L 43/0894* (2013.01); *H04M 7/0081* (2013.01)

(58) Field of Classification Search
CPC ..... H04L 43/02; H04L 43/04; H04L 43/0894; H04M 7/0081
(Continued)

(56) References Cited

U.S. PATENT DOCUMENTS 5,970,143 A * 10/1999 Schneier ............. G07F 17/3218
                                                          713/181
7,680,038 B1    3/2010 Gourlay
(Continued)

FOREIGN PATENT DOCUMENTS

CN        102035748 B      7/2014
CN        104090745 A     10/2014
(Continued)

OTHER PUBLICATIONS

Communication dated Nov. 29, 2022, issued by the International Searching Authority in counterpart International Application No. PCT/KR2022/012712 (PCT/ISA/210).
(Continued)

*Primary Examiner* — Thuong Nguyen
(74) *Attorney, Agent, or Firm* — Sughrue Mion, PLLC (57) ABSTRACT

A method and an electronic device for managing network resources among application traffic are provided. The method comprises identifying a real time application that is running on the electronic device and consuming network resources, determining whether the real time application
(Continued)

belongs to a prioritized class, based on the real time application belonging to the prioritized class, determining a User Identifier (UID) of the real time application, and prioritizing the network resources for the real time application based on the UID.

17 Claims, 8 Drawing Sheets

(51) Int. Cl.
  *H04L 43/04* (2022.01)
  *H04L 43/0894* (2022.01)
  *H04M 7/00* (2006.01)
(58) Field of Classification Search
  USPC ........................................................ 709/224
  See application file for complete search history.

(56) References Cited

U.S. PATENT DOCUMENTS

| | | | |
|---|---|---|---|
| 9,503,384 B1* | 11/2016 | Oliveira | H04L 43/0882 |
| 9,686,127 B2 | 6/2017 | Ramachandran et al. | |
| 11,094,413 B1* | 8/2021 | Golenski | G16H 50/30 |
| 11,108,686 B1* | 8/2021 | Thomas | H04L 45/38 |
| 2003/0037075 A1* | 2/2003 | Hannigan | G09B 5/06 |
| | | | 715/201 |
| 2003/0045359 A1* | 3/2003 | Leen | G07F 17/3234 |
| | | | 463/42 |
| 2007/0104096 A1* | 5/2007 | Ribera | H04L 45/22 |
| | | | 370/229 |
| 2008/0056302 A1* | 3/2008 | Erdal | H04L 65/65 |
| | | | 370/474 |
| 2009/0241170 A1 | 9/2009 | Kumar et al. | |
| 2010/0190555 A1* | 7/2010 | Dutilly | A63F 13/52 |
| | | | 463/43 |
| 2012/0133784 A1 | 5/2012 | Kajimura | |
| 2012/0257535 A1* | 10/2012 | DeWath | H04L 43/0876 |
| | | | 370/253 |
| 2012/0314568 A1* | 12/2012 | Tan | H04W 12/08 |
| | | | 370/230 |
| 2013/0235868 A1 | 9/2013 | Owens et al. | |
| 2014/0092922 A1* | 4/2014 | Le Pallec | H04L 43/50 |
| | | | 370/503 |
| 2014/0123319 A1* | 5/2014 | Porjo | H04L 63/10 |
| | | | 726/28 |
| 2014/0269755 A1* | 9/2014 | Veiga | H04L 47/2416 |
| | | | 370/429 |
| 2015/0116519 A1 | 4/2015 | Jarske et al. | |
| 2015/0146535 A1* | 5/2015 | Koo | G06Q 20/322 |
| | | | 370/235 |
| 2015/0172572 A1 | 6/2015 | Kim | |
| 2016/0007233 A1 | 1/2016 | Rao et al. | |
| 2016/0139877 A1* | 5/2016 | Park | G10L 15/22 |
| | | | 715/727 |
| 2017/0048789 A1* | 2/2017 | Tan | H04B 17/318 |
| 2017/0287460 A1 | 10/2017 | Stewart et al. | |
| 2018/0063853 A1 | 3/2018 | Szabo et al. | |
| 2018/0102123 A1 | 4/2018 | Tisch et al. | |
| 2018/0139645 A1 | 5/2018 | Yu et al. | |
| 2018/0145914 A1* | 5/2018 | Zhao | H04L 47/25 |
| 2019/0123978 A1 | 4/2019 | Shaw et al. | |
| 2020/0241917 A1 | 7/2020 | Chen et al. | |
| 2020/0272509 A1 | 8/2020 | Wright et al. | |
| 2021/0105339 A1 | 4/2021 | Heiser et al. | |
| 2022/0303244 A1* | 9/2022 | Wondra | H04L 63/0281 |
| 2022/0414699 A1* | 12/2022 | Kelly | G06Q 30/0209 |
| 2022/0417823 A1* | 12/2022 | Jia | H04W 36/385 |

FOREIGN PATENT DOCUMENTS

| | | |
|---|---|---|
| CN | 104639466 B | 4/2018 |
| CN | 104734996 B | 11/2018 |
| CN | 105159781 B | 11/2018 |
| CN | 106357558 B | 10/2019 |
| CN | 110554922 A | 12/2019 |
| KR | 10-2019-0060436 A | 6/2019 |

OTHER PUBLICATIONS

Communication dated Nov. 29, 2022, issued by the International Searching Authority in counterpart International Application No. PCT/KR2022/012712 (PCT/ISA/237).
Communication issued on Jan. 25, 2024 by the Indian Intellectual Property Office in corresponding Indian Application No. 202141038707.
Communication issued Aug. 20, 2024 by the European Patent Office in European Patent Application No. 22861729.6.

* cited by examiner

METHOD AND ELECTRONIC DEVICE FOR MANAGING NETWORK RESOURCES AMONG APPLICATION TRAFFIC

CROSS-REFERENCE TO RELATED APPLICATIONS

This application is a continuation of International Application No. PCT/KR2022/012712, filed on Aug. 25, 2022, in the Korean Intellectual Property Receiving Office, which is based on and claims priority to Indian Provisional Patent Application No. 202141038707, filed on Aug. 26, 2021, in the Indian Patent Office, and to Indian Complete Patent Application No. 202141038707, filed on Aug. 10, 2022, in the Indian Patent Office, the disclosures of each of which are incorporated by reference herein in their entireties.

BACKGROUND

1. Field

The present disclosure relates to an electronic device, and more specifically to a method and the electronic device for managing network resources among application traffic.

2. Description of Related Art

Real time application traffic such as video call traffic, gaming traffic, etc. is latency-sensitive and requires a guaranteed bit rate for smoother operation. Unlike saturating application traffic such as a file download, the real time application traffic operates at a constant bit rate and requires loss-free conditions for better operation. A file download in the background significantly affects a video call experience. Generally, the file download starts by trying to consume a maximum bandwidth of a connection, and thereby adversely impacts on the video calling experience causing a quality of the video to become poor, and often the video will be frozen most of the time. While gaming, a ping increases if there is a file download in the background, which greatly worsens an online gaming experience.

SUMMARY

It is an aspect to provide a method and an electronic device for managing among application traffic.

In accordance with an aspect of the disclosure, a method for managing network resources among application traffic by an electronic device is provided. The method may comprise identifying a real time application that is running on the electronic device and consuming network resources; determining whether the real time application belongs to a prioritized class; based on the real time application belonging to the prioritized class, determining a User Identifier (UID) of the real time application; and prioritizing the network resources for the real time application based on the UID.

In accordance with another aspect of the disclosure, an electronic device for managing network resources among application traffic is provided. The electronic device may include a memory; and at least one processor coupled to the memory. The at least one processor is configured to identify a real time application that is running on the electronic device and that is consuming network resources, determine whether the real time application belongs to a prioritized class, based on the real time application belonging to the prioritized class, determine a User Identifier (UID) of the real time application, and prioritize the network resources for the real time application based on the UID.

In accordance with yet another aspect of the disclosure, a non-transitory computer readable storage medium storing instructions for managing network resources among application traffic is provided. The instructions, when executed by at least one processor of an electronic device, causes the electronic device to perform operations. The operations may comprise identifying a real time application that is running on the electronic device and consuming network resources; determining whether the real time application belongs to a prioritized class; based on the real time application belonging to the prioritized class, determining a User Identifier (UID) of the real time application; and prioritizing the network resources for the real time application based on the UID.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may in some embodiments be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

As described above, it is advantageous to provide a solution to dynamically cater network bandwidth between real time application traffic and saturating application traffic.

Thus, it is an aspect to provide a method and an electronic device for prioritization of network resources among application traffic. The electronic device classifies and prioritizes real time application traffic over saturating application traffic in the electronic device. Further, the electronic device dynamically controls a background download based on trend of real time network traffic and the prioritization, which provides a smoother user experience in case of the real time application traffic and ensures a versatile download speed to the saturating application traffic.

According to some embodiments, a method for prioritization of network resources among application traffic may include identifying, by the electronic device, a real time application of the electronic device consuming the network resources. The method may include determining, by the electronic device, whether the identified real time application belongs to a prioritized class. The method may include determining, by the electronic device, a User Identifier (UID) of identified real time application, in response to determining that the identified real time application belongs to the prioritized class. The method may include prioritizing, by the electronic device, the network resources to the identified real time application based on the UID.

In some embodiments, determining, by the electronic device, whether the identified real time application belongs to the prioritized class, may comprise determining, by the electronic device, whether the identified real time application is one of a Voice/Video over Internet Protocol (VoIP) application and a gaming application; and performing, by the electronic device, at least one of determining that the identified real time application belongs to the prioritized class, in response to determining that the identified real time application is one of the VoIP application and the gaming application, or determining that the identified real time application belongs to a non-prioritized class, in response to determining that the identified real time application is not one of the VoIP application and the gaming application.

In some embodiments, determining, by the electronic device, whether the identified real time application is one of the VoIP application and the gaming application, may comprise performing, by the electronic device, one of: determining that the identified real time application is the VoIP application when an application traffic of the identified real time application consumes an audio hardware of the electronic device, and determining, by the electronic device, that the identified real time application is the gaming application when the electronic device detects a real time User Datagram Protocol (UDP) traffic, where the prioritized class comprises both VoIP and gaming traffic at the same time.

In some embodiments, prioritizing, by the electronic device, the network resources to the identified real time application based on the UID, may comprise setting, by the electronic device, a flag for the UID of the identified real time application in a UID owner map comprises the UID and associated parameters, wherein the associated parameters comprises a protocol, a source address, a source port, a destination address, and a destination port; detecting, by an Extended Berkley Packet Filter (eBPF) egress of the electronic device, the flag set for the UID of the identified real time application from the UID owner map; sending, by the eBPF egress, packet data embedded with the associated parameters of the identified real time application to an eBPF ingress of the electronic device; searching, by the eBPF ingress, for the associated parameters from the packet data upon receiving the packet data; and controlling, by the electronic device, data speeds of the identified real time application and non-real time applications of the electronic device based on detection of the associated parameters, where the non-real time applications belong to a non-prioritized class.

In some embodiments, controlling, by the electronic device, the data speeds of the identified real time application and the non-real time applications of the electronic device based on detection of the associated parameters, may comprise prioritizing, by the electronic device, the identified real time application, upon detecting the associated parameters of the identified real time application from the packet data; and deprioritizing, by the electronic device, the non-real time applications, upon not detecting associated parameters of the non-real time applications from the packet data.

In some embodiments, controlling, by the electronic device, the data speeds of the identified real time application and the non-real time applications of the electronic device, may comprise determining, by the electronic device, a total data speed available at the electronic device; determining, by the electronic device, the data speed of the non-real time applications based on an application behavior of priority class traffic of the identified real time application and the total data speed; determining, by the electronic device, whether the data speed of the non-real time applications is greater than a lower data speed threshold; setting, by the electronic device, the data speed of the non-real time applications to a pre-defined data speed, in response to determining that the data speed of the non-real time applications is greater than the lower data speed threshold; polling, by the electronic device, a data speed for the identified real time application by determining a data speed of the identified real time application using a Simple Moving Average (SMA) method and an Exponential Moving Average (EMA) method; determining, by the electronic device, whether the data speed of the identified real time application is progressing or shrinking or stable based on a higher data speed threshold; and performing, by the electronic device, one of: continue polling of the data speed for the identified real time application, in response to determining that the data speed of the identified real time application is progressing, reducing the data speed for the non-real time applications, and continue polling of the data speed for the identified real time application, in response to determining that the data speed of the identified real time application is shrinking, and identifying the higher data speed threshold as a minimum data speed required for the identified real time application, reducing the data speed for the non-real time applications, and continue polling of the data speed for the identified real time application, in response to determining that the data speed of the identified real time application is stable.

According to some embodiments, an electronic device for prioritization of the network resources among the application traffic may include an application prioritization engine, a memory, and a processor, where the application prioritization engine is coupled to the memory and the processor. The application prioritization engine may be configured for identifying the real time application of the electronic device consuming the network resources. The application prioritization engine may be configured for determining whether the identified real time application belongs to the prioritized class. The application prioritization engine may be configured for determining the User Identifier (UID) of identified real time application, in response to determining that the identified real time application belongs to the prioritized class. The application prioritization engine may be configured for prioritizing the network resources to the identified real time application based on the UID.

These and other aspects of the embodiments herein will be better appreciated and understood when considered in conjunction with the following description and the accompanying drawings. It should be understood, however, that the following descriptions, while indicating various embodiments and numerous specific details thereof, are given by way of illustration and not of limitation. Many changes and modifications may be made within the scope of the embodiments, and the embodiments herein include all such modifications.

Unlike existing methods and systems, the electronic device classifies and prioritizes real time application traffic over saturating application traffic in the electronic device. Further, the electronic device dynamically controls a background download based on trend of the real time network traffic and the prioritization, which provides a smoother user experience in case of the real time application traffic and ensures a versatile download speed to the saturating application traffic.

Figure 1:
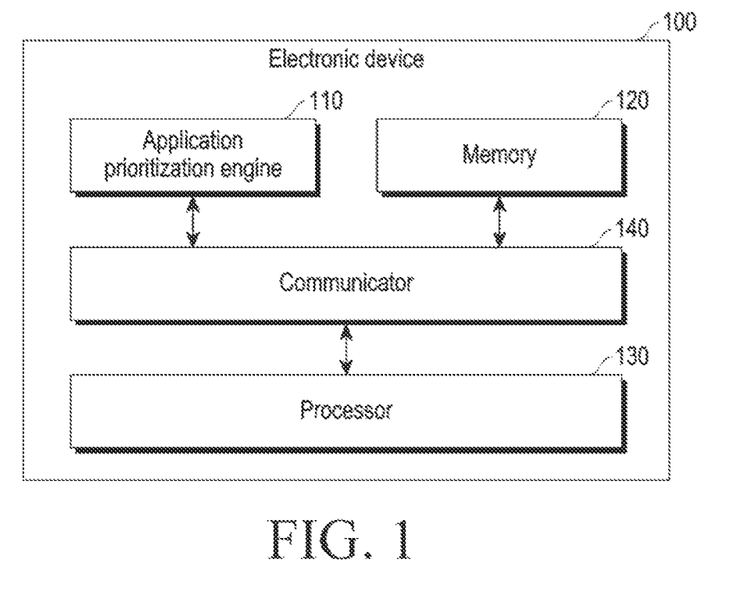
FIG. 1 is a block diagram of an electronic device for prioritization of network resources among application traffic, according to an embodiment.

FIG. 1 is a block diagram of an electronic device (100) for prioritization of network resources among application traffic, according to an embodiment. Examples of the electronic device (100) include, but are not limited to a smartphone, a tablet computer, a Personal Digital Assistance (PDA), a desktop computer, an Internet of Things (IoT), a wearable device, etc. In an embodiment, the electronic device (100) includes an application prioritization engine (110), a memory (120), a processor (130), and a communicator (140). In some embodiments, the electronic device (100) may further include an Extended Berkley Packet Filter (eBPF) ingress and an eBPF egress. The application prioritization engine (110) is implemented by processing circuitry such as logic gates, integrated circuits, microprocessors, microcontrollers, memory circuits, passive electronic components, active electronic components, optical components, hardwired circuits, or the like, and may in some embodiments be driven by a firmware. The circuits may, for example, be embodied in one or more semiconductor chips, or on substrate supports such as printed circuit boards and the like. The application prioritization engine (110) and the processor (130) may be integrally referred to as at least one processor The application prioritization engine (110) identifies a real time application of the electronic device (100) that is consuming the network resources. In an embodiment, real time applications may be foreground applications, whereas non-real time applications may be background applications. The application prioritization engine (110) determines whether the identified real time application belongs to a prioritized class (e.g. edge traffic, foreground traffic, a network slice real time traffic, etc.). The prioritized class may belong to a set of applications or traffic to be prioritized. The application prioritization engine (110) determines a User Identifier (UID) of the identified real time application, in response to determining that the identified real time application belongs to the prioritized class. The application prioritization engine (110) prioritizes the network resources to the identified real time application based on the UID.

In an embodiment, for determining whether the identified real time application belongs to the prioritized class, the application prioritization engine (110) determines whether the identified real time application is one of a Voice/Video over Internet Protocol (VoIP) application and a gaming application. The application prioritization engine (110) determines that the identified real time application belongs to the prioritized class, in response to determining that the identified real time application is one of the VoIP application and the gaming application. The application prioritization engine (110) determines that the identified real time application belongs to a non-prioritized class (e.g. non-edge traffic, background traffic, a non-network slice, download traffic, etc.), in response to determining that the identified real time application is not one of the VoIP application and the gaming application.

In an embodiment, for determining whether the identified real time application is one of the VoIP application and the gaming application, the application prioritization engine (110) determines that the identified real time application is the VoIP application when an application traffic of the identified real time application consumes an audio hardware of the electronic device (100). The application prioritization engine (110) determines that the identified real time application is the gaming application when the electronic device (100) detects real time User Datagram Protocol (UDP) traffic, where the prioritized class comprises both VoIP and gaming traffic at the same time.

In an embodiment, for prioritizing the network resources to the identified real time application based on the UID, the application prioritization engine (110) sets a flag (i.e. an application prioritization (AP) flag) for the UID of the identified real time application in a UID owner map that includes the UID and associated parameters, where the associated parameters include, for example, a protocol, a source address, a source port, a destination address, and a destination port. The application prioritization engine (110) is configured to detect the flag set for the UID of the identified real time application from the UID owner map using the eBPF egress of the electronic device (100). The application prioritization engine (110) is configured to send packet data embedded with the associated parameters of the identified real time application to the eBPF ingress of the electronic device (100) using the eBPF egress. The application prioritization engine (110) is configured to search for the associated parameters from the packet data upon receiving the packet data using the eBPF ingress. The application prioritization engine (110) controls data speeds of the identified real time application and the non-real time applications of the electronic device (100) based on detection of the associated parameters, where the non-real time applications belong to a non-prioritized class.

In an embodiment, the application prioritization engine (110) prioritizes the identified real time application, upon detecting the associated parameters of the identified real time application from the packet data. The application prioritization engine (110) deprioritizes the non-real time applications, upon not detecting associated parameters of the non-real time applications from the packet data.

In an embodiment, for controlling the data speeds of the identified real time application and the non-real time applications of the electronic device (100), the application prioritization engine (110) determines a total data speed available at the electronic device (100). The application prioritization engine (110) determines the data speed of the non-real time applications based on an application behavior of the priority class traffic of the identified real time application and the total data speed. The application prioritization engine (110) determines whether the data speed of the non-real time applications is greater than a lower data speed threshold. The application prioritization engine (110) sets the data speed of the non-real time applications to a predefined data speed, in response to determining that the data speed of the non-real time applications is greater than the lower data speed threshold. The application prioritization engine (110) polls a data speed for the identified real time application by determining a data speed of the identified real time application using a Simple Moving Average (SMA) method and an Exponential Moving Average (EMA) method. The application prioritization engine (110) determines whether the data speed of the identified real time application is progressing or shrinking or stable based on a higher data speed threshold.

In an embodiment, the application prioritization engine (110) continues polling of the data speed for the identified real time application, in response to determining that the data speed of the identified real time application is progressing.

In an embodiment, the application prioritization engine (110) reduces the data speed for the non-real time applications, in response to determining that the data speed of the identified real time application is shrinking. The application prioritization engine (110) continues polling of the data speed for the identified real time application.

In an embodiment, the application prioritization engine (110) identifies the higher data speed threshold as a minimum data speed for the identified real time application, in response to determining that the data speed of the identified real time application is stable. The application prioritization engine (110) reduces the data speed for the non-real time applications. The application prioritization engine (110) continues polling of the data speed for the identified real time application.

An exemplary embodiment is described as follows. Upon detecting an Application Prioritization (AP) enable event, the application prioritization engine (110) looks for background traffic. If the background traffic is detected, the application prioritization engine (110) calls a traffic control API, where traffic control rules for IPv4 and IPv6 are initialized and the background traffic is limited to 1 Mbps. The application prioritization engine (110) monitors a trend of the priority traffic (e.g., increasing or decreasing or stable) with the help of a Simple Moving Average (SMA) and Exponential Moving Average (EMA). The application prioritization engine (110) decides an action to increase or decrease the background traffic based on the threshold. If the trend of the priority traffic is increasing, the application prioritization engine (110) increases the background limit (BG) by factor of 2. If the trend of the priority traffic is decreasing, the application prioritization engine (110) decreases the BG limit by factor of 2. If the trend of the priority traffic is stable, the application prioritization engine (110) increases the background limit by factor of 2. Upon detecting an AP disable event, the application prioritization engine (110) terminates prioritization of the applications.

An example embodiment of a method for determining the threshold/limit is given as follows. When data speed of the priority application is <100 kbps then the threshold/limit taken as 10% of the data speed of the priority application. When data speed of the priority application is <1.5 Mbps then the threshold/limit taken as 5% of the data speed of the priority application. When data speed of the priority application is >1.5 Mbps then the threshold/limit taken as 3% of the data speed of the priority application. However, these values are only examples and embodiments are not limited to these specific values.

An exemplary embodiment is described as follows. If the targeted application is in the foreground, the application prioritization engine (110) starts and the application prioritization engine (110) stops the targeted application and sends the targeted application to the background. Based on the UDP traffic, the application prioritization engine (110) receives an enable/disable event of a latency mode and takes corresponding action. For example, if the targeted application is in the foreground and if the latency mode is enabled, then the application prioritization engine (110) starts the AP. If the targeted application is in the background, then the application prioritization engine (110) terminates the AP. If a current latency of the targeted application is known, then the enabling and disabling can be further optimized.

In an embodiment, the application prioritization engine (110) determines a latency based on an in-app value displayed on a screen of the electronic device (100). A neural network-based toolkit may be used by the application prioritization engine (110) for processing video frame-by-frame, and converting the latency of the gaming application into text, and logging the same. The application prioritization engine (110) uses a figure that depicts a usage of the application to fetch an end-to-end application latency of the gaming application. The extraction is not only used in evaluation but also used for prioritization of the applications to enrich a gaming experience. Based on the latency, i.e. if the latency is increasing or decreasing or stable, the application prioritization engine (110) the prioritizes the application.

In an embodiment, the latency is coded into three types of color zones: a green color zone, a yellow color zone and a red color zone. The green color zone represents 0 to 100 ms latency, the yellow color zone represents 100 to 250 ms latency, and the red color zone represents the latency over 250 ms. In the green color zone, the game play will not be much impacted. In the yellow color zone there could be some glitches in the gaming experience. In the red color zone, there would definitely be a large impact on the gaming experience, e.g., a lagging gaming experience. Based on the color zone, the application prioritization engine (110) aims to reduce the latency using the application prioritization in consuming the network resource and to enrich a Quality of Experience.

The memory (120) stores the applications installed in the electronic device (100). The memory (120) stores instructions to be executed by the at least one processor including the processor (130) and the application prioritization engine (110) to cause the electronic device (100) to perform operations described herein. The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In some embodiments, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store a larger amount of information than is available in a storage space of the memory (120). In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a Central Processing Unit (CPU), an application processor, or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

Although the FIG. 1 shows the hardware components of the electronic device (100), it is to be understood that embodiments are not limited thereon. In some embodiments, the electronic device (100) may include less or a greater number of components. Further, the labels or names of the components are used only for illustrative purpose and does not limit the scope of the disclosure. One or more components can be combined together to perform same or substantially similar function for prioritization of the network resources among the applications.

Figure 2:
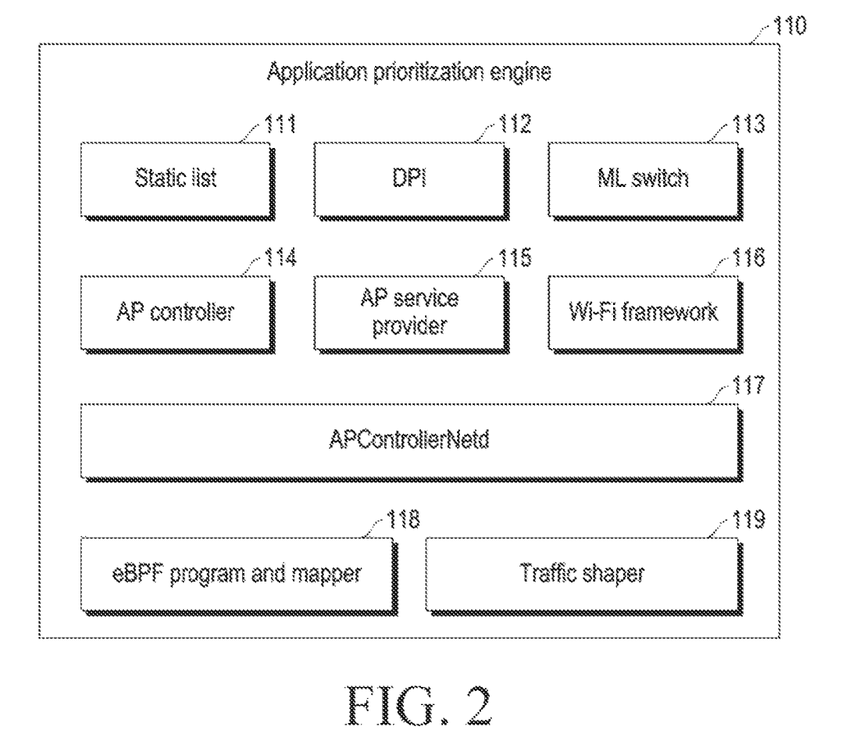
FIG. 2 is a block diagram of an application prioritization engine for prioritizing the network resources to an identified real time application based on a UID, according to an embodiment.

FIG. 2 is a block diagram of the application prioritization engine (110) for prioritizing the network resources to the identified real time application based on the UID, according to an embodiment. In an embodiment, the application prioritization engine (110) includes a static list (111), a Deep Packet Inspection Engine (DPI) (112), a Machine Learning (ML) switch (113), an AP controller (114), an AP service provider (115), a Wireless Fidelity (Wi-Fi) framework (116), an APControllerNetd (117), an eBPF program and mapper (118), and a traffic shaper (119). The static list (111), the DPI (112), the ML switch (113), the AP controller (114), the AP service provider (115), the Wi-Fi framework (116), the APControllerNetd (117), the eBPF program and mapper (118), and the traffic shaper (119) are implemented by processing circuitry such as logic gates, integrated circuits, microprocessors, microcontrollers, memory circuits, passive electronic components, active electronic components, optical components, hardwired circuits, or the like, and may in some embodiments be driven by a firmware. The circuits may, for example, be embodied in one or more semiconductor chips, or on substrate supports such as printed circuit boards and the like.

The static list (111) includes classification of VoIP service, gaming service, edge service, network slice service, enterprise service, etc. The DPI (112) fine tunes traffic classification. The ML switch (113) performs supervised learning-based classification and time series-based decision.

The AP controller (114) is a novel event driven lightweight classification module that controls enabling and disabling of the event. The AP controller (114) monitors an activity manager of an Operating System (OS) of the electronic device (100) to detect an application that is running in real time. The AP controller (114) decides if the real time application is a priority application. If the real time application is the priority application, the AP controller (114) sub-classifies the real time application into either a video calling application or a gaming application. In the case of the video calling application, the AP controller (114) triggers the event when the electronic device (100) uses the audio hardware. On the other hand, in the case of the gaming application, the AP controller (114) detects if the game traffic is real time UDP gaming traffic. The event is triggered if the AP controller (114) detects the real time UDP gaming traffic. The gaming traffic is detected according to specific criteria, such as:

The traffic should not be a DNS traffic (port-based)
The traffic should be interactive traffic (inter-packet-arrival time)
The average packet size of the traffic must not be (i.e., is not) over 1000 Bytes (thin-streamed)
The traffic is on certain predefined ports (known gaming ports)

The AP controller (114) detects the VoIP traffic and shares the UID of the application that is to be prioritized. The AP service provider (115) checks whether the AP is to be enabled and then shares the UID to the eBPF program and mapper (118).

The AP service provider (115) is enabled based on the event from the AP controller (114). The AP controller (114) provides the event indicating if the AP service provider (115) is to be enabled or disabled. The parameterized event contains the UID of the application that is to be prioritized. On receiving an enable event, the AP service provider (115) periodically polls for the traffic statics of the priority application (pSpdr) and overall data speed of the Wi-Fi interface (tSpdr). From the overall data speed and the data speed of the priority application, the data speed of the non-priority application (npSpdr=tSpdr−pSpdr) is computed. As mentioned earlier, simultaneous real time traffic and download are observed mostly during the Wi-Fi condition, and therefore in some embodiments the AP service provider (115) is enabled only when the Wi-Fi is connected. Hence, the APE service looks for the event from the Wi-Fi framework (116) regarding the connectivity status and Wi-Fi characteristics such as Service Set Identifier (SSID), Basic Service Set Identifier (BSSID), link speed, Received Signal Strength Indicator (RSSI), frequency bands, etc. Based on the SSID+ BSSID, the Wi-Fi is uniquely identified and populated with historical performance. The other parameters control the non-priority traffic speed (i.e. data speed) based on the current connected Wi-Fi characteristics. A periodic poll (e.g., for every second) is triggered to fetch these parameters and check whether an AP dynamic control is to be used or not. The AP service provider (115) stops polling upon receiving a disable event from the AP controller (114). Therefore, to avoid processor consumption, the AP service provider (115) is enabled only during priority traffic detection, making processor consumption optimal.

The APControllerNetd (117) is a network daemon module that listens to the commands from the AP service provider (115) using an OS interface definition language. The AP service provider (115) registers the internet protocol tables pinned with the eBPF program and mapper (118) and sets a bandwidth that is set by the AP service provider (115). The APControllerNetd (117) also initiates the eBPF program and mapper (118).

The eBPF program and mapper (118) controls traffic flow in the ingress and egress queues. The eBPF program and mapper (118) adds or removes the application prioritization enable (APE) flag based on a command received from the AP service provider (115).

The traffic shaper (119) controls the data speed and burstiness of the non-priority traffic. The traffic shaper (119) rates and ceils based on token bucketing, and controls a burst size to control a packet pacing. The AP service provider (115) notifies the bandwidth to be set (BWSet$_{rx}$), at the current condition depending on the traffic characteristics and the network conditions to the traffic shaper (119). The traffic shaper (119) adds the BWSet$_{rx}$ as the limit to the non-priority application. The AP service provider (115) uses a default Linux Kernel Traffic Controller (TC) for throttling the non-priority traffic. While shaping the packet in the TC, the throttling limit and the burst size are vital parameters. The traffic shaper (119) determines the throttling limit dynamically depending on the priority traffic. Likewise, the burst size must be dynamic to avoid bloating issues. The restricted traffic throughput might not reach the throttling limit if the burst size is small. On the other hand, if the burst size is large, the large burst size might create a bloating issue and make the traffic burst. The burst size factor (BS$_{factor}$) is set dynamically based on the processing latency ε and the throttling limit BW$_{cap}$. Since the ε is in millisecond and BW$_{cap}$ is set in megabits per second, a relation is given as the following:

$$BS_{factor} \text{ (b)} = (\varepsilon \times 10^{-3}) \text{ (s)} \times (BW_{cap} \times 10^6) \text{ (bps)}$$

$$i.e.\ BS_{factor} \text{ (Kb)} = \varepsilon \times BW_{cap}$$

Although the FIG. 2 shows the hardware components of the application prioritization engine (110), it is to be understood that embodiments are not limited thereto. In some embodiments, the application prioritization engine (110) may include a lesser or a greater number of components. Further, the labels or names of the components are used only for illustrative purpose and does not limit the scope of the disclosure. One or more components can be combined together to perform same or substantially similar function for prioritizing the network resources to the identified real time application based on the UID.

Figure 3:
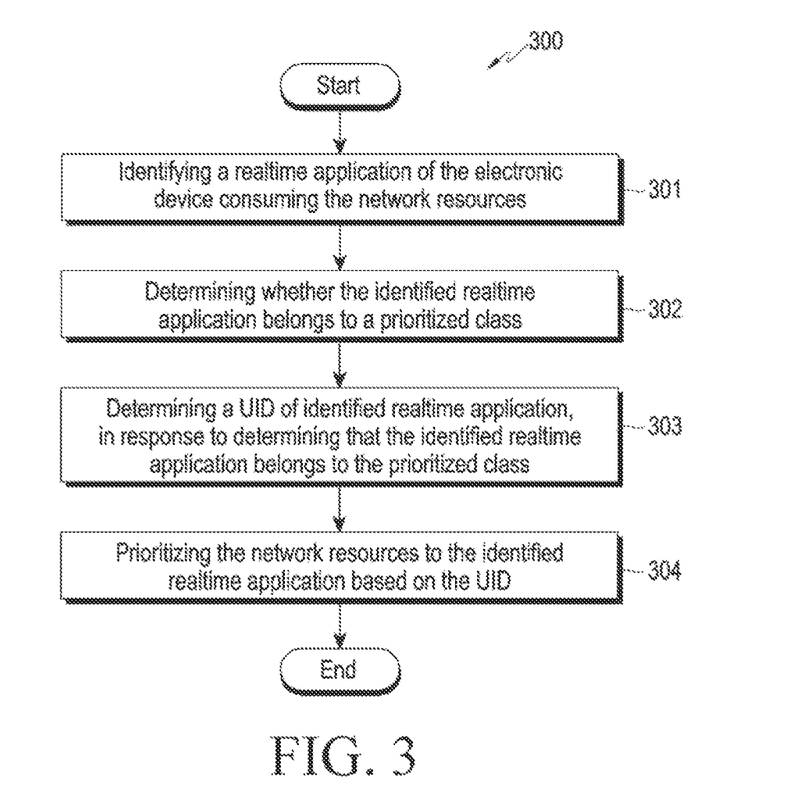
FIG. 3 is a flow diagram illustrating a method for prioritization of the network resources among the application traffic, according to an embodiment.

FIG. 3 is a flow diagram illustrating a method for prioritization of the network resources among the application traffic, according to an embodiment. In an embodiment, the application prioritization engine (110) performs steps 301-304 of the flow diagram (300). At step 301, the method includes identifying a real time application of the electronic device (100) that is consuming the network resources. At step 302, the method includes determining whether the identified real time application belongs to a prioritized class. At step 303, the method includes determining a UID of the identified real time application, in response to determining that the identified real time application belongs to the prioritized class. At step 304, the method includes prioritizing network resources to the identified real time application based on the UID.

Figure 4:
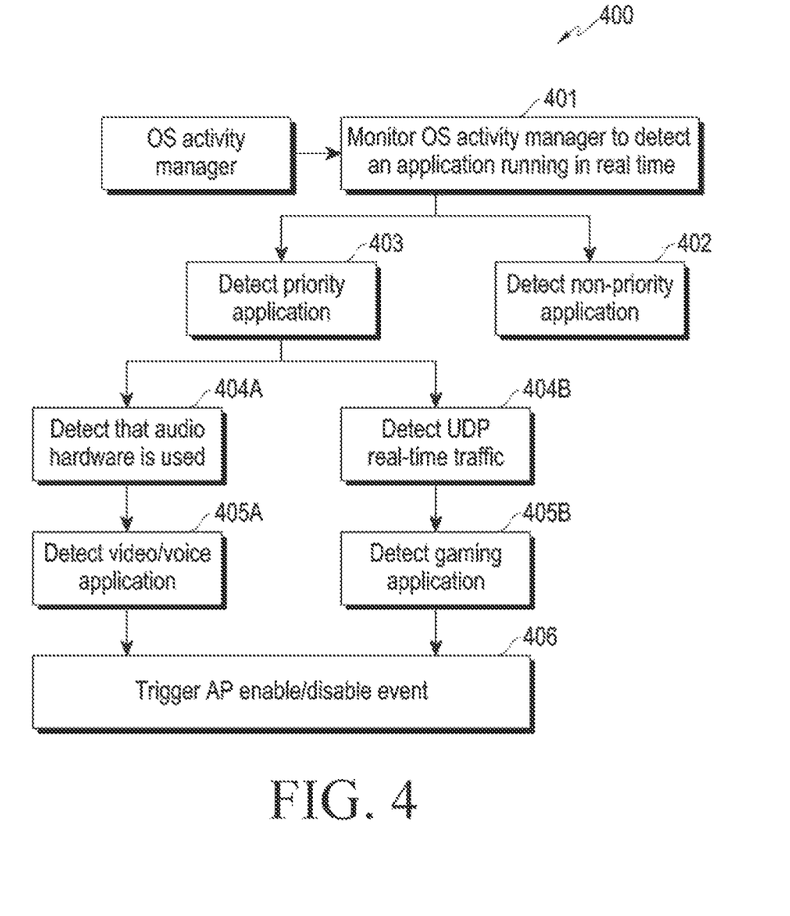
FIG. 4 is a flow diagram illustrating a method for triggering an Application Prioritization (AP) enable/disable event, according to an embodiment.

FIG. 4 is a flow diagram (400) illustrating a method for triggering an Application Prioritization (AP) enable/disable event, according to an embodiment. At 401, the AP controller (114) monitors the activity manager of the OS to detect the application running in the real time. The AP controller (114) determines whether the application is a priority application or a non-priority application, based on the monitoring. At 402, upon detecting the non-priority application, the AP controller (114) follows a method for assigning the network resources. At 403, upon detecting the priority application, the AP controller (114) determines a type of the real time application according to 404A-405B. At 404A-405A, when detecting that the audio hardware is being consumer, the AP controller (114) determines that the voice/video application is currently running in the real time. At 404B-405B, when detecting that the UDP real time traffic is being consumed, the AP controller (114) determines that the gaming application is currently running in the real time. At 406, the AP controller (114) triggers the AP enable/disable event upon detecting either gaming application or the voice/video application in the real time.

Figure 5:
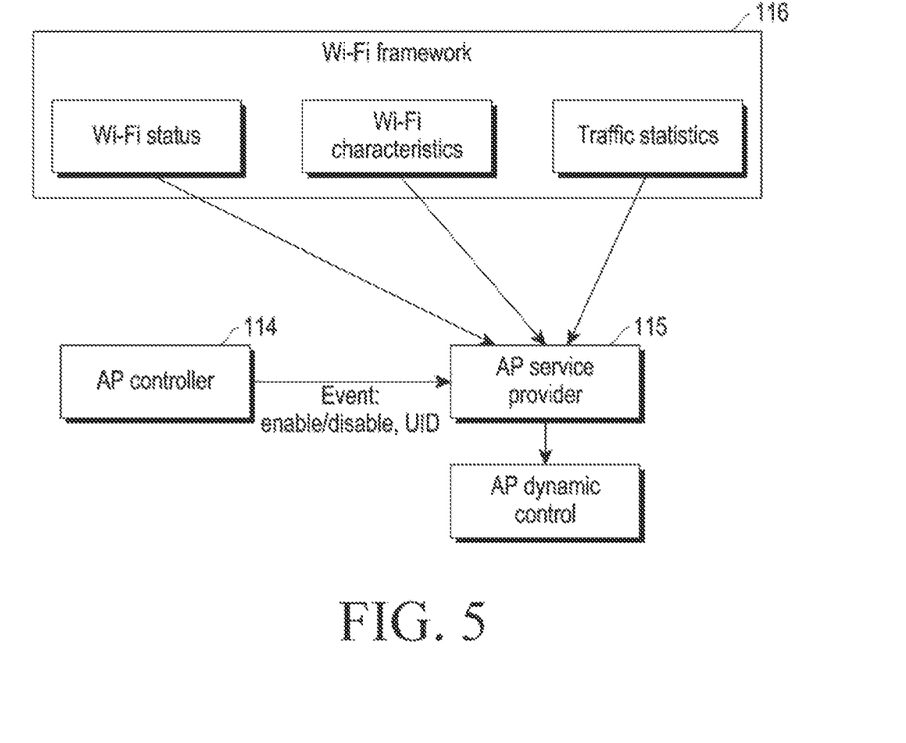
FIG. 5 is a flow diagram illustrating a method for triggering AP dynamic control, according to an embodiment.

FIG. 5 is a flow diagram illustrating a method for triggering AP dynamic control, according to an embodiment. The AP service provider (115) receives Wi-Fi status, Wi-Fi characteristics, and traffic statistics from the Wi-Fi framework (116). The AP service provided (115) receives the enable/disable event and the UID of the application to be prioritized from the AP controller (114). Further, the AP service provider (115) dynamically controls the AP based on the event, the UID, the Wi-Fi status, the Wi-Fi characteristics, and traffic statistics.

Figure 6A:
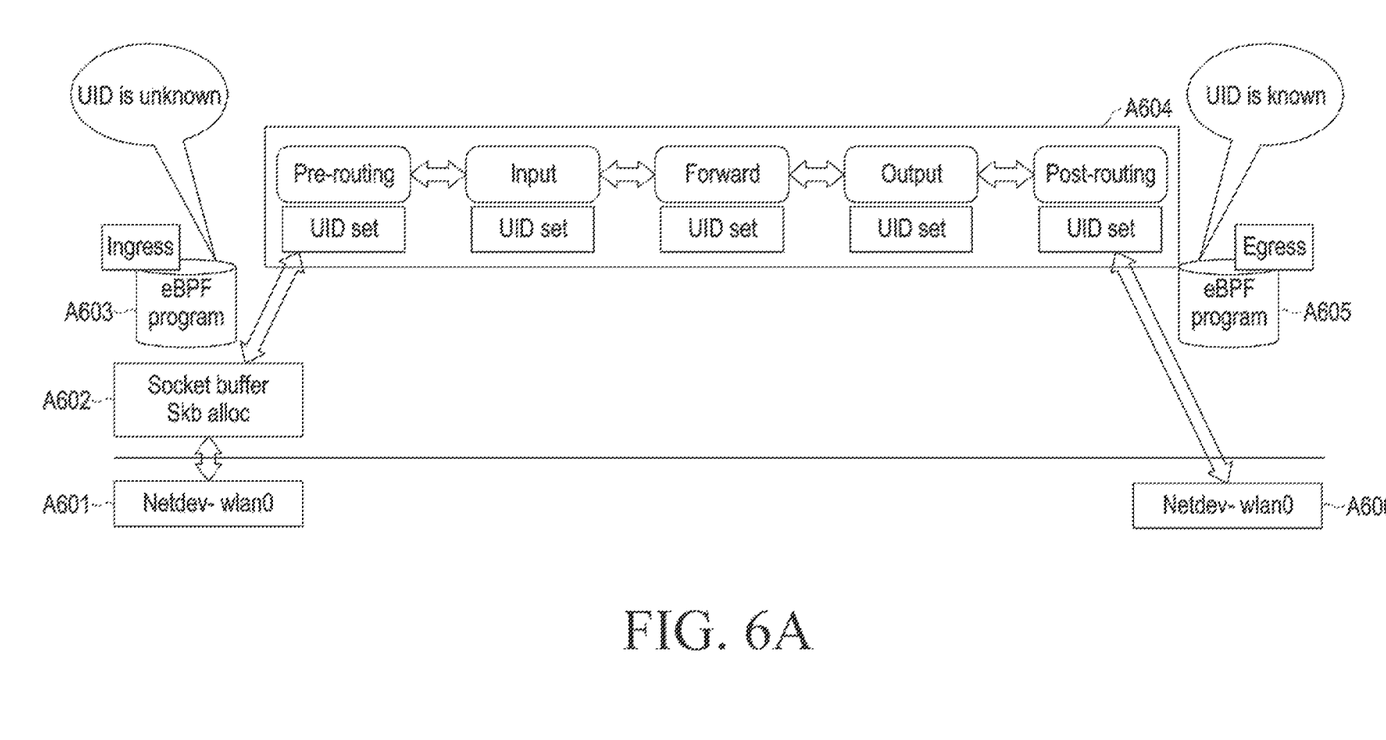
FIG. 6A-6B illustrates a comparison of the method according to various embodiments with a related art method of controlling of app traffic.
Figure 6B:
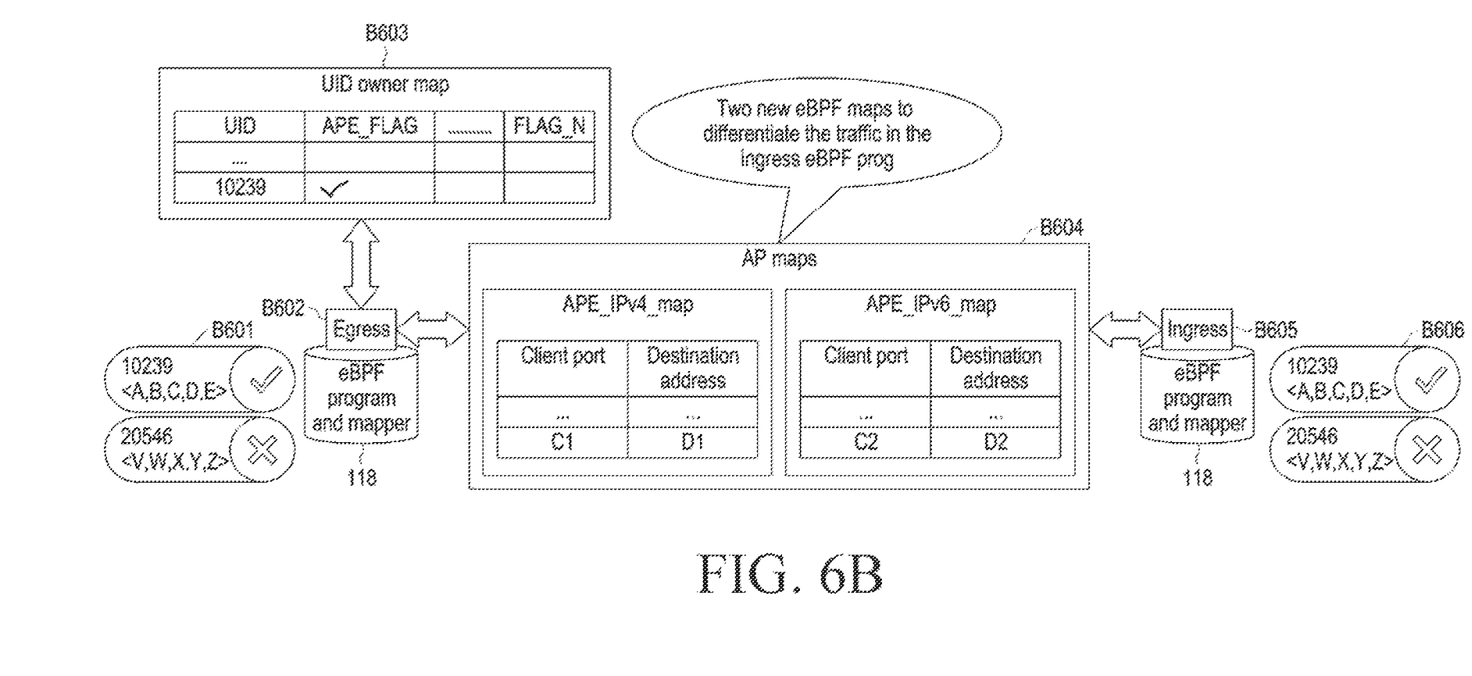

FIG. 6A-6B illustrate a comparison of a method according to an embodiment with existing related art method of controlling of app traffic. FIG. 6A illustrates a problem in the related art data flow method. In the OS, the application traffic is identified using the UID (e.g. 10239). Once a socket buffer (skb) is allocated, and before the packet leaves a netdev driver (A601-A602), the packet is hit in the eBPF program (A603) for processing in the ingress and the egress, respectively. The UID of the application traffic is set in a pre-routing chain (A604), and hence the UID is unknown in the eBPF program (A603). Hence, the application download traffic cannot be directly controlled by the eBPF program (A603) using the UID.

To address this problem, an AP map (B603) is implemented to store the connection details to be prioritized, as shown in the FIG. 6B. The packets enter the egress eBPF program and mapper (118) as the connection is established (B602). The UID owner map (B603) has the details of all the UID and the flags that are enabled for the specific UID. The UID owner map (B603), which includes a bitmap of flags, is used to determine if a current packet with a specific UID is to be prioritized. For example, in FIG. 6B, UID 10239 (B601) has been set with the APE flag APE_FLAG. There can be more than one flag for a specific UID and hence, the flag is stored in form of a bit vector with each bit corresponding to a specific functionality.

If a packet is to be prioritized, the eBPF program and mapper (118) adds an entry in the AP maps (B604). The AP maps (B604) contain the client port and the server destination address as a unique key. Since a map (B604) is included for IPv4 and IPv6, the connection details are added according to the IP protocol (i.e. IPv4 and IPv6). In the OS client, the client port uniquely identifies most of the applications. However, to be on the safer side, the destination address details are added in the key. The AP map data structure avoids duplication in the entry. The AP maps (B604) are flushed upon receiving the AP disable event or if any error occurs in the AP controller (114). Since the UID of the incoming packets is unknown, the eBPF program and mapper (118) uses the AP maps to match the connection details and to take action accordingly.

The application traffic enters the eBPF program and mapper (118) as UID 10239<protocol, source address, source port, destination address, destination port>. For example, the protocol, source address, source port, destination address, and destination port of the UID 10239 are indicated as A, B, C, D, and E, respectively, in FIG. 6B. Since the egress (B602B) is aware of the application, the egress (B602B) looks into the UID owner map (B603) and checks for the APE flag. If the specific UID is set with APE flag, the egress (B602B) returns true and returns false otherwise. If true is returned, a part of the connection details (e.g. Client port and destination address) is stored in the IPv4 or IPv6 AP maps (B604) in accordance to the IP address type. The AP map of the IPv4 is termed as APE_IPv4_map, whereas the AP map of the IPv6 is termed as APE_IPv6_map. When the packet arrives, the ingress eBPF program and mapper (118) looks up the APE maps and if the connection detail is found, then the connection is marked as priority connection and is not throttled. If the connection detail is not found in the APE maps, then the connection is considered as low priority traffic and is throttled according to the AP.

Figure 7:
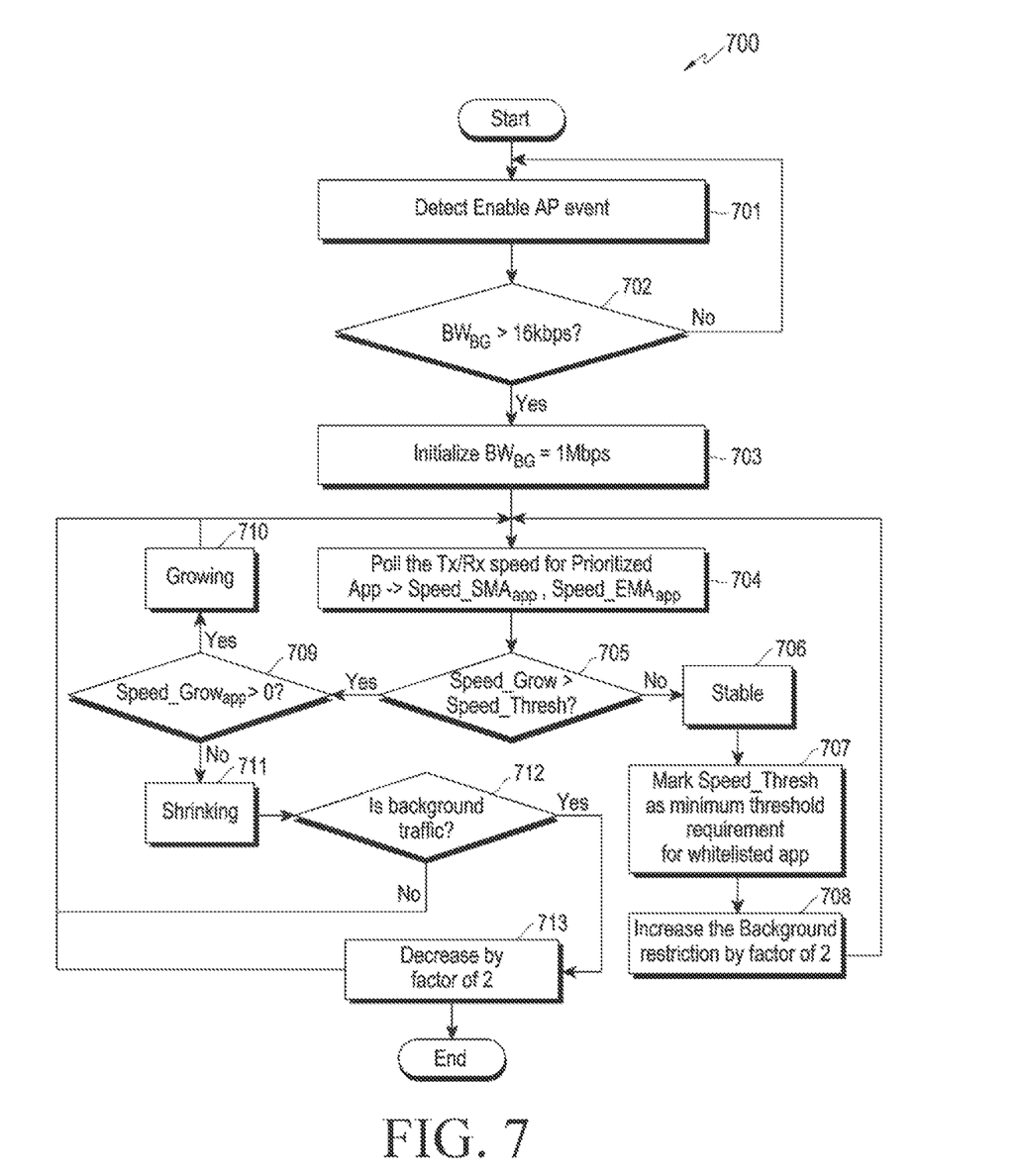
FIG. 7 is a flow diagram illustrating a method for dynamically controlling application prioritization (AP), according to an embodiment.

FIG. 7 is a flow diagram (700) illustrating a method for dynamically controlling application prioritization (AP), according to an embodiment. In FIG. 7, BWBG represents Bandwidth used by non-real time applications, where BWBG=(Total bandwidth−Bandwidth used by real time applications). Speed_GROWapp=Speed_SMAapp−Speed_EMAapp. Speed_Threshr represents a speed threshold, where Speed_Threshr=3% to 10% based on bitrate. Speed_Del=2N. Speed_SMAapp is a speed determined using an SMA method, and Speed_EMAapp is a speed determined using an EMA method, as discussed above.

At 701, the electronic device (100) detects an enable AP event when the real time application is to be prioritized. At 702, the electronic device (100) determines whether the BWBG is greater than 16 kilobits per seconds (kbps). At 703, upon determining that the BWBG is greater than 16 kilobits per seconds (702, Yes), the electronic device (100) initializes the BWBG to 1 megabits per second (Mbps). When the BWBG is not greater than 16 kilobits per seconds (702, No), the electronic device (100) continues to detect the enable AP event. At 704, the electronic device (100) polls the transmission and data reception (Tx/Rx) speed for the prioritized application according to Speed_SMAapp, and Speed_EMAapp. At 705, the electronic device (100) determines whether the data speed grows more than the data speed threshold, i.e., Speed_Grow>Speed_Thresh). Upon detecting that the data speed does not grow more than the data speed threshold (705, No), the electronic device (100) detects that the network resource consumption of the target application is stable at 5706. At 707, the electronic device (100) marks the data speed threshold as a minimum threshold requirement for whitelisted application. At 708, the electronic device (100) increases the background restriction on the non-real time application in consuming the network resource by factor of 2, i.e. 2N and returns to the step 704.

On the other hand, upon detecting that the data speed grows more than the data speed threshold (705, Yes), the electronic device (100) checks whether the Speed_GROWapp is greater than zero, i.e., Speed_Growapp>0) at 709. Upon detecting that the Speed_GROWapp is greater than zero (709, Yes), the electronic device (100) detects that the network resource consumption of the target application is growing at 710, and returns to the step 704.

Upon detecting that the Speed_GROWapp is not greater than zero (i.e., is less than or equal to zero) (709, No), the electronic device (100) detects that the network resource consumption of the target application is shrinking at 711. At 712, the electronic device (100) determines whether there is non-real time traffic. Upon not detecting the non-real time traffic (i.e. network resource is consumed by non-real time applications) (712, No), the electronic device returns to step 704. Upon detecting the non-real time traffic (712, Yes), the electronic device (100) decreases the network resource consumption of the non-real time applications by factor of 2 (i.e., N/2) and returns to the step 704

The various actions, acts, blocks, steps, or the like in the flow diagrams (300, 400, 700) may be performed in the order presented, in a different order, or simultaneously. In some embodiments, some of the actions, acts, blocks, steps, or the like may be omitted, added, modified, skipped, or the like without departing from the scope of the embodiments.

The various embodiments disclosed herein can be implemented using at least one hardware device that performs network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while various embodiments herein have been described, those skilled in the art will recognize that the embodiments herein can be practiced with modification within the scope of the embodiments as described herein and as set forth in the appended claims.

What is claimed is:

1. A method for managing network resources among application traffic by an electronic device, comprising:
identifying a real time application that is running on the electronic device and consuming network resources;
determining whether the real time application belongs to a prioritized class or a non-prioritized class, wherein the prioritized class is prioritized for the network resources over the non-prioritized class;
in response to determining that the real time application belongs to the prioritized class, determining a User Identifier (UID) of the real time application; and
prioritizing the network resources for the real time application based on the UID,
wherein prioritizing the network resources for the real time application comprises controlling a data speed limit of background traffic that is associated with other applications running in a background on the electronic device, based on a data speed of the real time application that belongs to the prioritized class, and the data speed limit of the background traffic is determined as a ratio among a plurality of predetermined ratios with respect to the data speed of the real time application, and wherein determining whether the real time application belongs to the prioritized class or the non-prioritized class comprises:

determining that the real time application is a Voice/Video over Internet Protocol (VoIP) application which consumes an audio hardware of the electronic device, when detecting the audio hardware of the electronic device is consumed;

determining that the real time application is a gaming application which consumes a real time User Datagram Protocol (UDP) traffic, when detecting the real time UDP traffic is consumed; and determining that the real time application belongs to the prioritized class, when the real time application is determined as one of the VoIP application and the gaming application.

2. The method of claim 1, wherein determining whether the real time application belongs to the prioritized class or the non-prioritized class, further comprises:

determining that the real time application belongs to the non-prioritized class, when the real time application is not the VoIP application or the gaming application.

3. The method of claim 1, wherein prioritizing the network resources for the real time application based on the UID, comprises:

setting a flag for the UID of the real time application in a UID owner map that includes the UID and associated parameters, the associated parameters including at least one of a protocol, a source address, a source port, a destination address, and a destination port;

detecting the flag that is set for the UID of the real time application from the UID owner map;

sending packet data embedded with the associated parameters of the real time application to an Extended Berkley Packet Filter (eBPF) ingress of the electronic device;

searching for the associated parameters from packet data upon receiving the packet data; and controlling the data speeds of the real time application and the non-real time application of the electronic device based on detection of the associated parameters, wherein the non-real time application belongs to a non-prioritized class.

4. The method of claim 3, wherein the controlling comprises:

prioritizing the real time application, upon detecting the associated parameters of the real time application from the packet data; and deprioritizing the non-real time application, upon not detecting associated parameters of the non-real time application from the packet data.

5. The method of claim 3, wherein the controlling comprises:

determining a total data speed that is available at the electronic device;

determining the data speed of the non-real time application based on the total data speed and an application behavior of priority class traffic of the real time application;

determining whether the data speed of the non-real time application is greater than a lower data speed threshold;

setting the data speed of the non-real time application to a pre-defined data speed, based on the data speed of the non-real time application being greater than the lower data speed threshold;

polling the data speed of the real time application by determining the data speed of the real time application using a Simple Moving Average (SMA) method and an Exponential Moving Average (EMA) method;

determining whether the data speed of the real time application is one of progressing or shrinking or stable, based on a higher data speed threshold; and continue polling of the data speed when the data speed of the real time application is progressing, reducing the data speed for the non-real time applications and continuing polling of the data speed of the real time application, when the data speed of the real time application is shrinking, and identifying the higher data speed threshold as a minimum data speed for the real time application, reducing the data speed for the non-real time application, and continuing polling of the data speed of the real time application, when the data speed of the real time application is stable.

6. The method of claim 1, wherein the real time application is a foreground application running in the foreground on the electronic device.

7. The method of claim 1, wherein the prioritized class comprises edge traffic, foreground traffic, a network slice, or real time traffic.

8. An electronic device for managing network resources among application traffic comprising:

a memory;

at least one processor coupled to the memory, the at least one processor configured to:

identify a real time application that is running on the electronic device and that is consuming network resources, determine whether the real time application belongs to a prioritized class or a non-prioritized class, wherein the prioritized class is prioritized for the network resources over the non-prioritized class, in response to determining that the real time application belongs to the prioritized class, determine a User Identifier (UID) of the real time application, and prioritize the network resources for the real time application based on the UID, wherein to prioritize the network resources for the real time application, the at least one processor is configured to control a data speed limit of background traffic that is associated with other applications running in a background on the electronic device, based on a data speed of the real time application that belongs to the prioritized class, and the data speed limit of the background traffic is determined as a ratio among a plurality of predetermined ratios with respect to the data speed of the real time application, and wherein to determine whether the real time application belongs to the prioritized class or the non-prioritized class, the at least one processor is configured to:

determine that the real time application is a Voice/Video over Internet Protocol (VoIP) application which consumes an audio hardware of the electronic device, when detecting that the audio hardware of the electronic device is consumed;

determine that the real time application is a gaming application which consumes a real time User Datagram Protocol (UDP) traffic, when detecting the real time UDP traffic is consumed; and determine that the real time application belong to the prioritized class, when the real time application is determined as one of the VoIP application and the gaming application.

9. The electronic device of claim 8, wherein to determine whether the real time application belongs to the prioritized class or the non-prioritized class, the at least one processor is configured to:

determine that the real time application belongs to the non-prioritized class when the real time application is not the VoIP application or the gaming application.

10. The electronic device of claim 8, wherein to prioritize the network resources, the at least one processor is configured to:

set a flag for the UID of the real time application in a UID owner map that includes the UID and associated parameters, the associated parameters including at least one of a protocol, a source address, a source port, a destination address, and a destination port;

detect the flag that is set for the UID of the real time application from the UID owner map;

send packet data embedded with the associated parameters of the real time application to an Extended Berkley Packet Filter (eBPF) ingress of the electronic device;

search for the associated parameters from the packet data upon receiving the packet data; and control the data speeds of the real time application and the non-real time application of the electronic device based on detection of the associated parameters, wherein the non-real time applications belongs to a non-prioritized class.

11. The electronic device of claim 10, wherein to control the data speeds, the at least one processor is further configured to:

prioritize the real time application, upon detecting the associated parameters of the real time application from the packet data; and deprioritize the non-real time applications, upon not detecting associated parameters of the non-real time applications from the packet data.

12. The electronic device of claim 10, wherein to control the data speeds, the at least one processor is further configured to:

determine a total data speed available at the electronic device;

determine the data speed of the non-real time application based on the total data speed and an application behavior of priority class traffic of the real time application;

determine whether the data speed of the non-real time application is greater than a lower data speed threshold;

set the data speed of the non-real time application to a pre-defined data speed, based on the data speed of the non-real time application being greater than the lower data speed threshold;

poll the data speed of the real time application by determining the data speed of the real time application using a Simple Moving Average (SMA) method and an Exponential Moving Average (EMA) method;

determine whether the data speed of the real time application is progressing or shrinking or stable, based on a higher data speed threshold;

continue polling of the data speed for the real time application, when the data speed of the real time application is progressing, reduce the data speed for the non-real time application and continue polling of the data speed for the real time application, when the data speed of the real time application is shrinking, and identify the higher data speed threshold as a minimum data speed for the real time application, reduce the data speed for the non-real time application, and continue polling of the data speed for the real time application, when the data speed of the real time application is stable.

13. The electronic device of claim 8, wherein the real time application is a foreground application running in the foreground on the electronic device.

14. The electronic device of claim 8, wherein the prioritized class comprises edge traffic, foreground traffic, a network slice, or real time traffic.

15. A non-transitory computer readable storage medium storing instructions for managing network resources among application traffic, wherein the instructions, when executed by at least one processor of an electronic device, causes the electronic device to perform operations comprising:

identifying a real time application that is running on the electronic device and consuming network resources;

determining whether the real time application belongs to a prioritized class or a non-prioritized class, wherein the prioritized class is prioritized for the network resources over the non-prioritized class;

in response to determining that the real time application belongs to the prioritized class, determining a User Identifier, UID, of the real time application; and prioritizing the network resources for the real time application based on the UID, wherein prioritizing the network resources for the real time application comprises controlling a data speed limit of background traffic that is associated with other applications running in a background on the electronic device, based on a data speed of the real time application that belongs to the prioritized class, and the data speed limit of the background traffic is determined as a ratio among a plurality of predetermined ratios with respect to the data speed of the real time application, and wherein determining whether the real time application belongs to the prioritized class or the non-prioritized class comprises:

determining that the real time application is a Voice/Video over Internet Protocol (VoIP) application which consumes an audio hardware of the electronic device, when detecting the audio hardware of the electronic device is consumed;

determining that the real time application is a gaming application which consumes a real time User Datagram Protocol (UDP) traffic, when detecting the real time UDP traffic is consumed; and determining that the real time application belong to the prioritized class, when the real time application is determined as one of the VoIP application and the gaming application.

16. The non-transitory computer readable storage medium of claim 15, wherein determining whether the real time application belongs to the prioritized class or the non-prioritized class, further comprises:

determining that the real time application belongs to the non-prioritized class, when the real time application is not the VoIP application or the gaming application.

17. The non-transitory computer readable storage medium of claim 15, wherein prioritizing the network resources for the real time application based on the UID, comprises:

setting a flag for the UID of the real time application in a UID owner map that includes the UID and associated parameters, the associated parameters including at least one of a protocol, a source address, a source port, a destination address, and a destination port;

detecting the flag that is set for the UID of the real time application from the UID owner map;

sending packet data embedded with the associated parameters of the real time application to an Extended Berkley Packet Filter, eBPF, ingress of the electronic device;

searching for the associated parameters from packet data upon receiving the packet data; and controlling the data speeds of the real time application and the non-real time application of the electronic device based on detection of the associated parameters, wherein the non-real time application belongs to a non-prioritized class.

* * * * *